(12) United States Patent
Morimoto et al.

(10) Patent No.: US 7,812,969 B2
(45) Date of Patent: Oct. 12, 2010

(54) THREE-DIMENSIONAL SHAPE MEASURING APPARATUS

(75) Inventors: Koji Morimoto, Hashimoto (JP); Yoshihisa Abe, Sakai (JP); Shinichi Horita, Osaka (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 0 days.

(21) Appl. No.: 11/820,972

(22) Filed: Jun. 21, 2007

(65) Prior Publication Data

US 2007/0296979 A1    Dec. 27, 2007

(30) Foreign Application Priority Data

Jun. 23, 2006    (JP)    .............................. 2006-174096

(51) Int. Cl.
*G01B 11/24*    (2006.01)
(52) U.S. Cl. ........................................ 356/601; 356/608
(58) Field of Classification Search ......... 356/600–624; 250/559.22–559.23; 382/118, 154; 702/159
See application file for complete search history.

(56) References Cited

U.S. PATENT DOCUMENTS

| 5,760,906 A * | 6/1998 | Sato ........................... 356/602 |
| 6,038,074 A * | 3/2000 | Kitaguchi et al. ........... 359/618 |
| 2005/0249400 A1* | 11/2005 | Fukumoto ................... 382/154 |
| 2007/0014468 A1* | 1/2007 | Gines et al. ................. 382/154 |

FOREIGN PATENT DOCUMENTS

| JP | 7-260452 A | 10/1995 |
| JP | 2004-220510 A | 8/2004 |
| JP | 2005-043084 A | 2/2005 |

OTHER PUBLICATIONS

Japanese "Notice of Reasons for Rejection", dated Jun. 24, 2008, for counterpart Japanese Patent Application No. 2006-174096, along with an English-language translation thereof.

* cited by examiner

*Primary Examiner*—Gregory J Toatley, Jr.
*Assistant Examiner*—Tri T Ton
(74) *Attorney, Agent, or Firm*—Sidley Austin LLP

(57) ABSTRACT

A three-dimensional shape measuring apparatus includes a measuring section and a data integrating section. The measuring section has three-dimensional measurement dimensions, and measures a three-dimensional shape of a measurement object in a non-contact state. The measuring section measures a three-dimensional shape of a part of the measurement object multiple times by shifting the measurement dimensions to obtain multiple measurement data. The measurement dimensions are shifted in such a manner that at least portions of consecutive measurement dimensions by the shifting are lapped one over the other. The data integrating section integrates the multiple measurement data to obtain the three-dimensional shape of the measurement object. The data integrating section executes the data integration, using reliability information attributed to the respective measurement data.

13 Claims, 17 Drawing Sheets

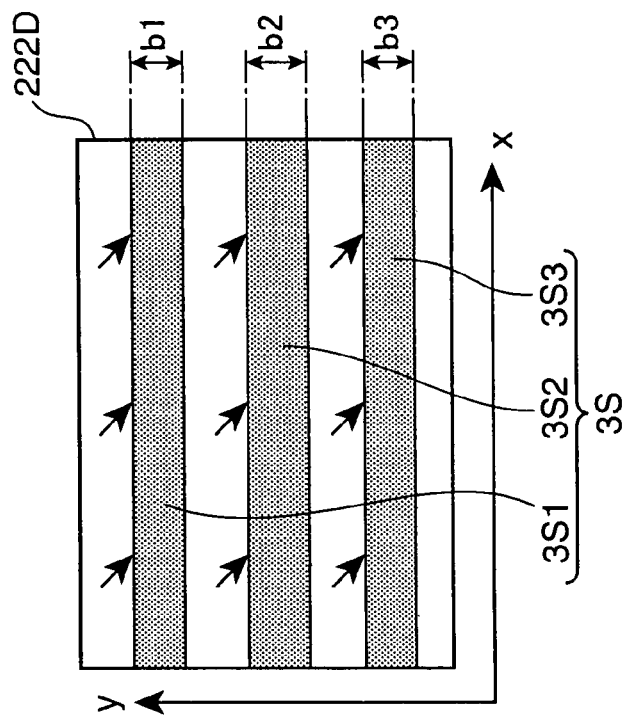
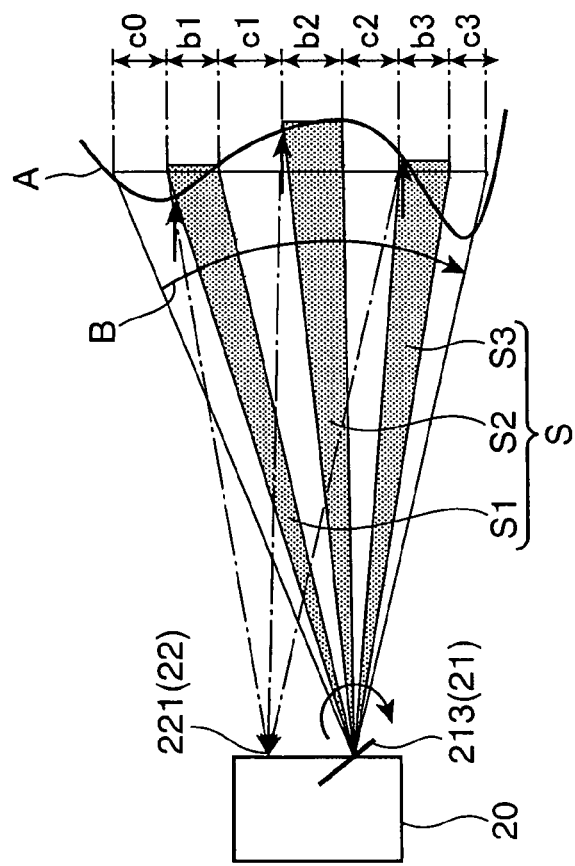
FIG.6A
FIG.6B

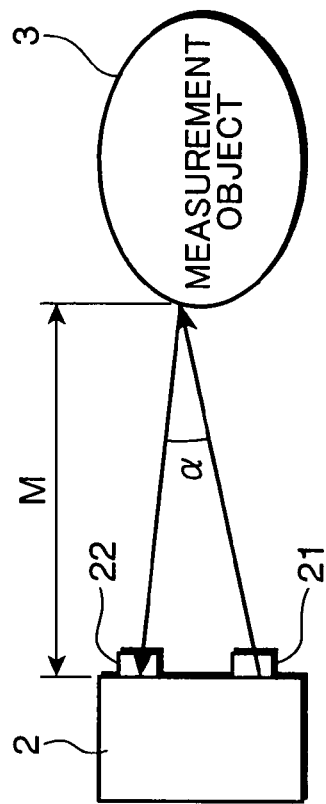
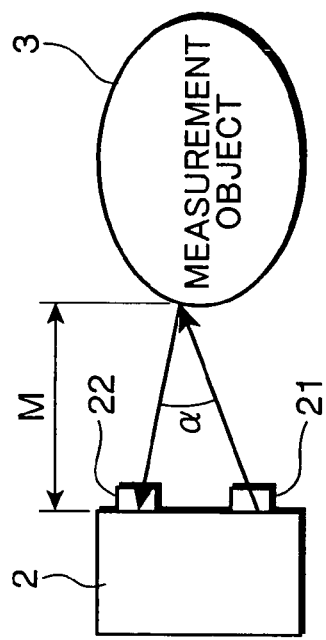

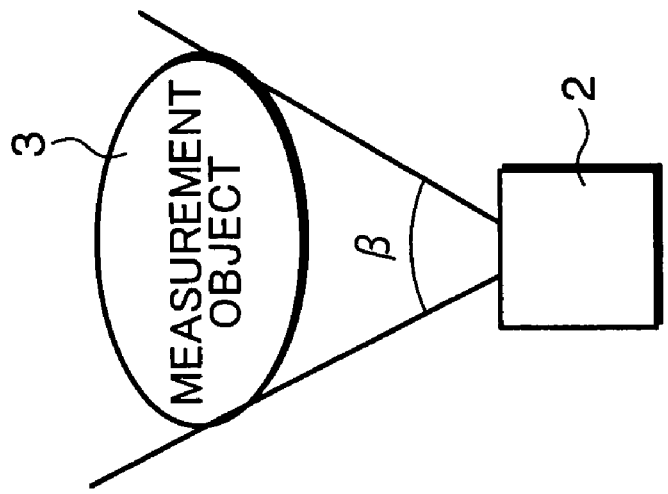
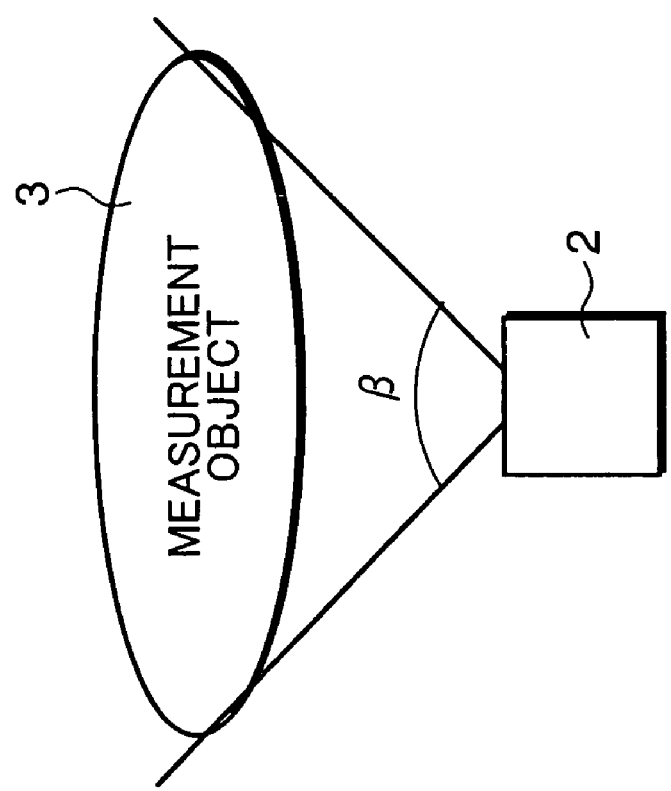

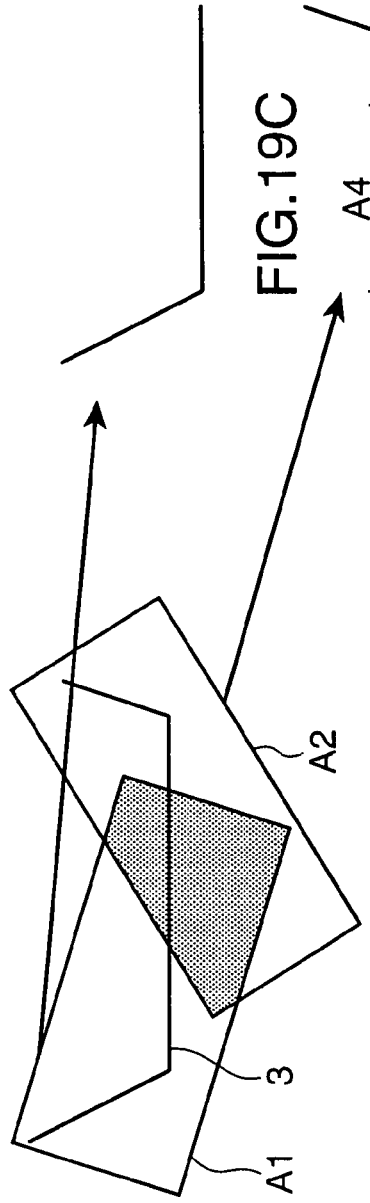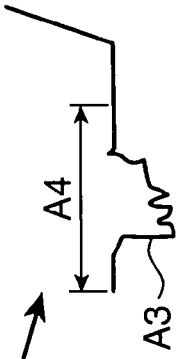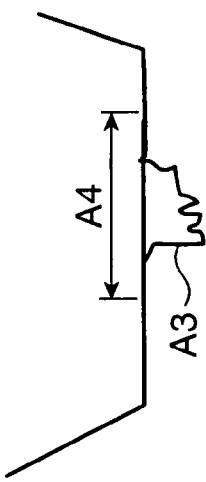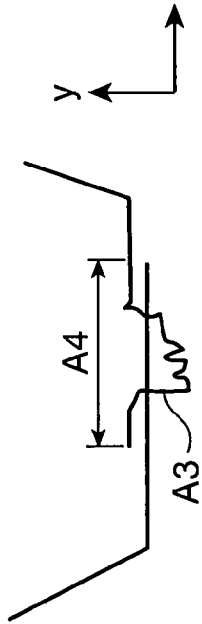

THREE-DIMENSIONAL SHAPE MEASURING APPARATUS

This application is based on Japanese Patent Application No. 2006-174096 filed on Jun. 23, 2006, the contents of which are hereby incorporated by reference.

BACKGROUND OF THE INVENTION

1. Field of the Invention

The present invention relates to a three-dimensional shape measuring apparatus for measuring a three-dimensional shape of an object to be measured (hereinafter, called as "measurement object") in a non-contact state.

2. Description of the Related Art

A method for measuring a three-dimensional shape of a measurement object with use of a non-contact three-dimensional shape measuring apparatus is utilized in various industrial fields e.g. computer graphics, designing, or automobile manufacturing. Examples of the measurement principle to be used in the three-dimensional measurement include a light cutting method using laser slit light or the like, a pattern projecting method using pattern light, a stereoscopic method based on images obtained by imaging a measurement object with a camera in different viewpoints, and a moire method using a moire technique. Three-dimensional data such as polygon data is derived based on the measurement data obtained by the aforementioned methods.

Measurement data concerning the shape of the measurement data, which is obtainable by a one-time measurement, is limited in any of the aforementioned methods. In view of this, in case of measuring the shape of a measurement object having large dimensions, a lens element having a large field of view (FOV) is used, or a distance from the measuring apparatus to the measurement object is increased, or a like approach is adopted to increase the measurement dimensions to be used in measuring the shape of the measurement object by a one-time measurement. However, since measurement dimensions and measurement precision have a relation of trade off, it is not desirable to increase the field of view, or the distance from the measuring apparatus to the measurement object, without considering the relation.

In view of the above, there is proposed an approach of measuring the shape of a measurement object multiple times while shifting the measurement dimensions in such a manner that at least portions of consecutive measurement dimensions by the shifting are lapped one over the other to measure the shape of the single measurement object. With use of this approach, most proximate points in the overlap portions are searched based on the acquired information by a software; position adjustment i.e. data registration is performed in such a manner as to minimize the sum of the measurement data errors; and the multiple measurement data are synthesized i.e. merged into single data.

Examples of the well-known data integration methods are e.g. as follows:

(i) a method for designating corresponding points among multiple measurement data to be integrated by a user's manual operation;

(ii) a method for setting reference information with respect to a measurement object or its vicinity (in Japanese Unexamined Patent Publication No. Hei 7-260452, plural spherical members are disposed in an overlap area where a measurement object is imaged in an overlap manner, and information relating to the center positions of the spherical members is used as reference information);

(iii) photogrammetry, in which markers are attached to a measurement object, information relating to the positions of the markers is obtained in advance by photogrammetry or a like technique, and the obtained information is used as reference information (in Japanese Unexamined Patent Publication No. 2004-220510, target markers having different color scheme patterns are used); and (iv) a method for estimating the position and posture of the measuring apparatus, and using the estimative information as reference information.

In any of the integration methods, the multiple measurement data concerning the overlap portions are handled equally. Accordingly, if degraded data e.g. data with much noise or a large measurement error is included in at least one of the measurement data, accurate data registration may be impossible. In order to avoid such a drawback, the user may manually select and erase the degraded data prior to data integration, which involves a cumbersome operation. Further, this operation requires a user's skill of judging the quality of the acquired data.

SUMMARY OF THE INVENTION

In view of the above problems residing in the conventional examples, it is an object of the invention to provide a three-dimensional shape measuring apparatus that enables to perform data integration with high precision, without a user's manual operation.

A three-dimensional shape measuring apparatus according to an aspect of the invention includes: a measuring section, provided with three-dimensional measurement dimensions, for measuring a three-dimensional shape of a measurement object in a non-contact state, the measuring section measuring a three-dimensional shape of a part of the measurement object multiple times by shifting the measurement dimensions to obtain multiple measurement data, the measurement dimensions being shifted in such a manner that at least portions of consecutive measurement dimensions by the shifting are lapped one over the other; and a data integrating section for integrating the multiple measurement data to obtain the three-dimensional shape of the measurement object, the data integrating section executing the data integration, using reliability information attributed to the respective measurement data.

These and other objects, features and advantages of the present invention will become more apparent upon reading the following detailed description along with the accompanying drawing.

BRIEF DESCRIPTION OF THE DRAWINGS

FIGS. 6A and 6B are schematic diagrams for describing a manner as to how slit light emitted from a light projector of the non-contact three-dimensional shape measuring device is projected onto a measurement plane for scanning.

FIGS. 9A and 9B are diagrams for describing a focus position usable as reliability information concerning three-dimensional shape measurement results.

FIGS. 10A and 10B are diagrams for describing a focal length of a lens element usable as the reliability information.

FIGS. 19A through 19E are diagrams for describing a function of a synthesizer in the embodiment.

DETAILED DESCRIPTION OF THE PREFERRED EMBODIMENTS

Figure 1:
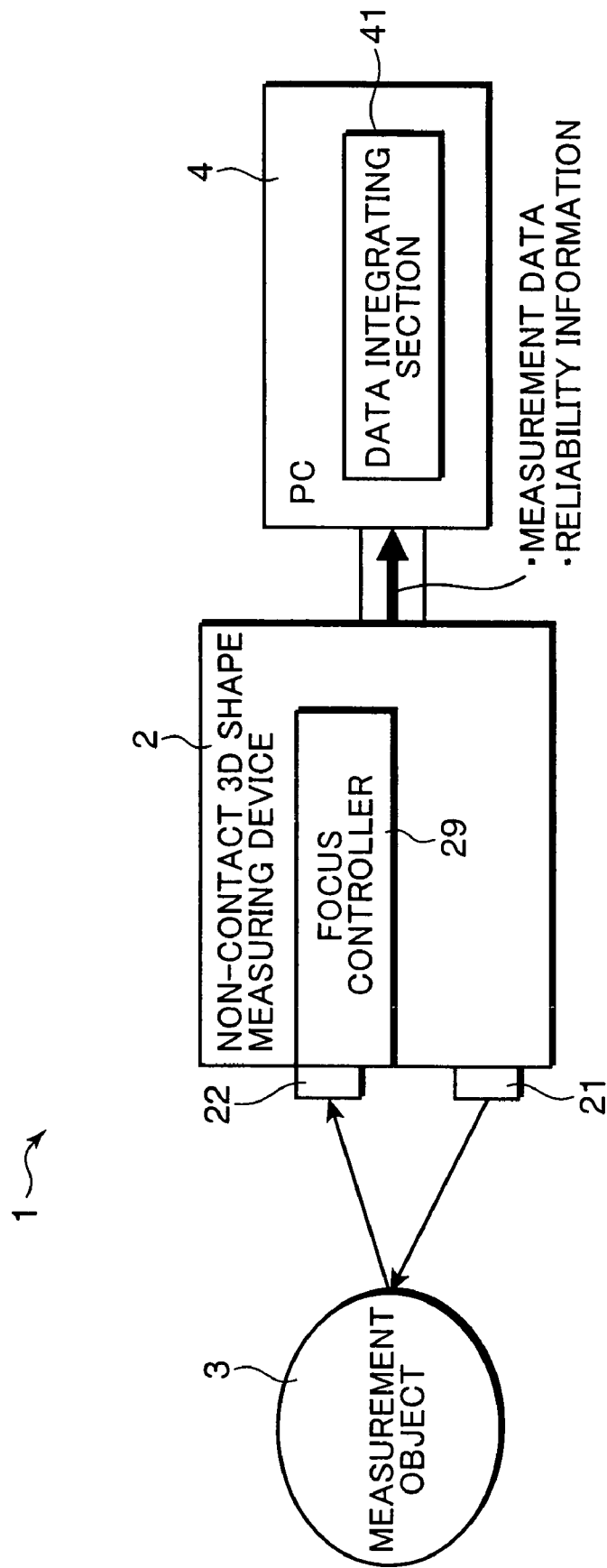
FIG. 1 is a block diagram showing an entire arrangement of a three-dimensional shape measuring apparatus embodying the invention.

FIG. 1 is a block diagram showing an entire arrangement of a three-dimensional shape measuring apparatus 1 embodying the invention. The three-dimensional shape measuring apparatus 1 includes a non-contact three-dimensional shape measuring device 2, provided with three-dimensional measurement dimensions, for measuring a three-dimensional shape of a measurement object multiple times in a non-contact state, and a personal computer 4 for integrating multiple measurement data obtained by the non-contact three-dimensional shape measuring device 2 to measure the three-dimensional shape of the measurement object. The non-contact three-dimensional shape measuring device 2 includes a light projector 21 and a light receiver 22.

An operation of the three-dimensional shape measuring apparatus 1 is briefly described in the following. The light projector 21 of the non-contact three-dimensional shape measuring device 2 is operated to sweepingly project slit laser light onto a measurement object 3. The light receiver 22 of the non-contact three-dimensional shape measuring device 2 receives the light reflected on the measurement object 3, converts the reflected light into an electric signal, and obtains measurement data by A/D conversion of the electric signal. Then, reliability information, which will be described latter, is attached to the measurement data, and the measurement data attached with the reliability information is transmitted to the personal computer 4. Upon receiving the measurement data attached with the reliability information, a data integrating section 41 of the personal computer 4 performs data integration with respect to an overlap portion of the multiple measurement data obtained by the multiple measurements, using the reliability information. Thereby, the three-dimensional shape of the measurement object having relatively large dimensions can be measured with high precision, and the shape of the measurement object can be measured by enlargedly imaging a part of the measurement object.

As will be described later, the reliability information may be obtained by the personal computer 4. This embodiment is described based on a premise that the personal computer 4 is connected to the non-contact three-dimensional shape measuring device 2. Alternatively, the series of operations up to the data integration may be performed by the non-contact three-dimensional shape measuring device 2.

In the following, the non-contact three-dimensional shape measuring device 2 is described primarily based on a method for measuring the shape of the measurement object 3 at a certain angular position multiple times while shifting three-dimensional measurement dimensions in a depthwise direction by changing the focus position of the light receiver 22 by a focus controller 29 to obtain multiple measurement data at the different focus positions in an overlap manner, in other words, based on a method for unfolding the overlap portion in the depthwise direction. A measurement method other than the above will be additionally described according to needs.

Figure 2:
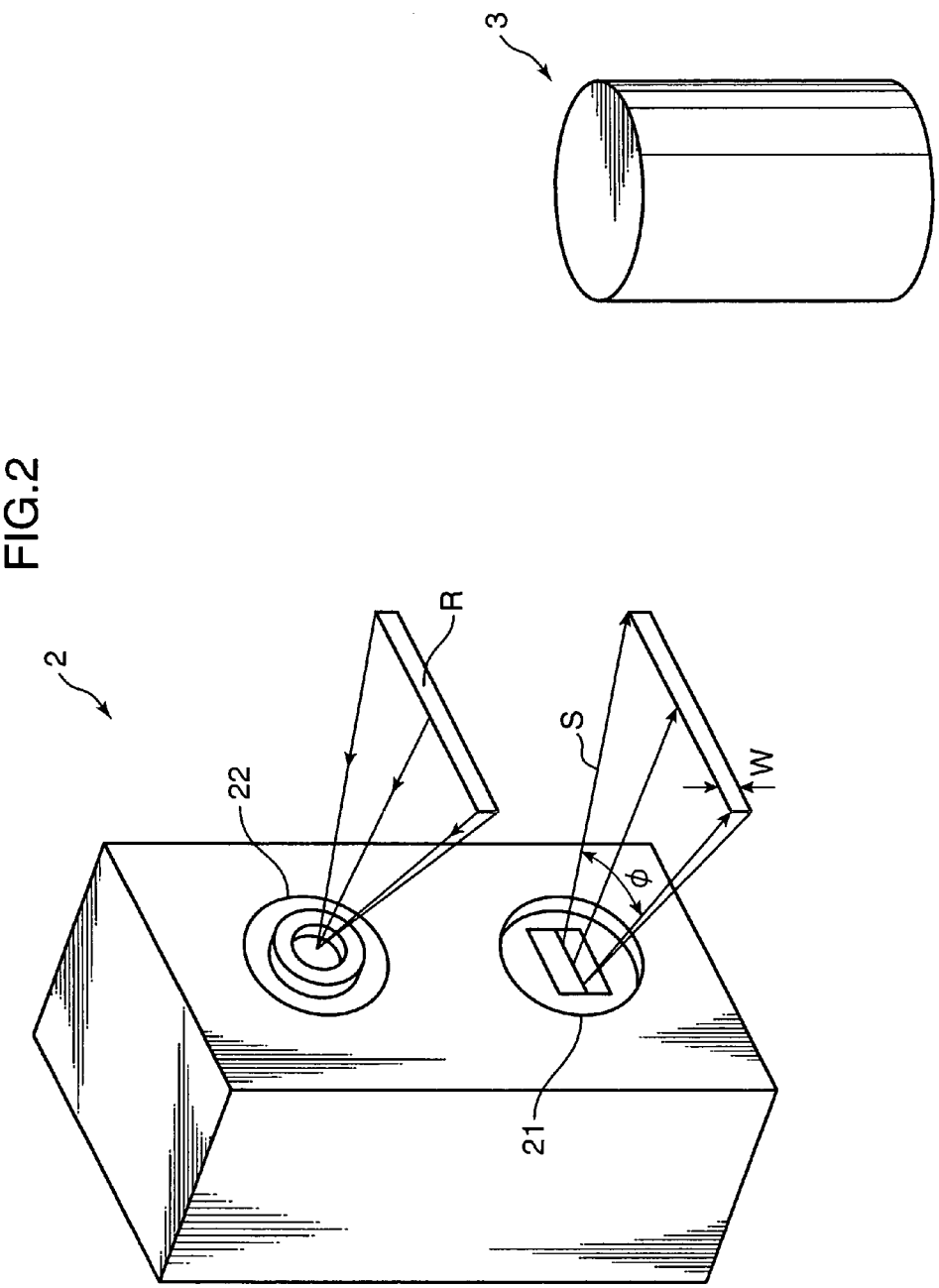
FIG. 2 is a perspective view showing an external appearance of a non-contact three-dimensional shape measuring device of the three-dimensional shape measuring apparatus in the embodiment.

FIG. 2 is a perspective view showing an external appearance of the three-dimensional shape measuring device 2. The non-contact three-dimensional shape measuring device 2 is a so-called three-dimensional digitizer for obtaining three-dimensional data concerning the measurement object 3, using the light cutting method of sweepingly projecting the slit laser light S onto the measurement object 3. Alternatively, there may be used a measuring apparatus operable by a measurement method other than the above e.g. a pattern projecting method using pattern light, a stereoscopic method based on images obtained by imaging a measurement object with a camera in different viewpoints, and a moire method using a moire technique. FIG. 2 shows a cylindrical columnar member as an example of the measurement object 3. Actually, however, press molded articles, plastic molded articles, die casting articles, and like articles are objects to be measured.

The non-contact three-dimensional shape measuring device 2 has a substantially rectangular parallelepiped housing with a built-in optical unit provided with a light emitter and a light receiver. The light projector 21 formed with a light projection window, and the light receiver 22 formed with a light receiving window are provided in the housing. The light projector 21 and the light receiver 22 are disposed away from each other by a predetermined distance depending on a baseline length.

As shown in FIG. 2, the light projector 21 emits the slit laser light S, which is irradiated in a fan-like shape. The slit laser light S is planar light i.e. scanning light which is irradiated with a radiation angle $\phi$ in a horizontal direction, and has a width W in a vertical direction. The slit laser light S is projected toward the measurement object 3. When the projected slit laser light S is reflected on the surface of the measurement object 3, a part of the reflected light R is allowed to be incident onto the light receiver 22.

Figure 3:
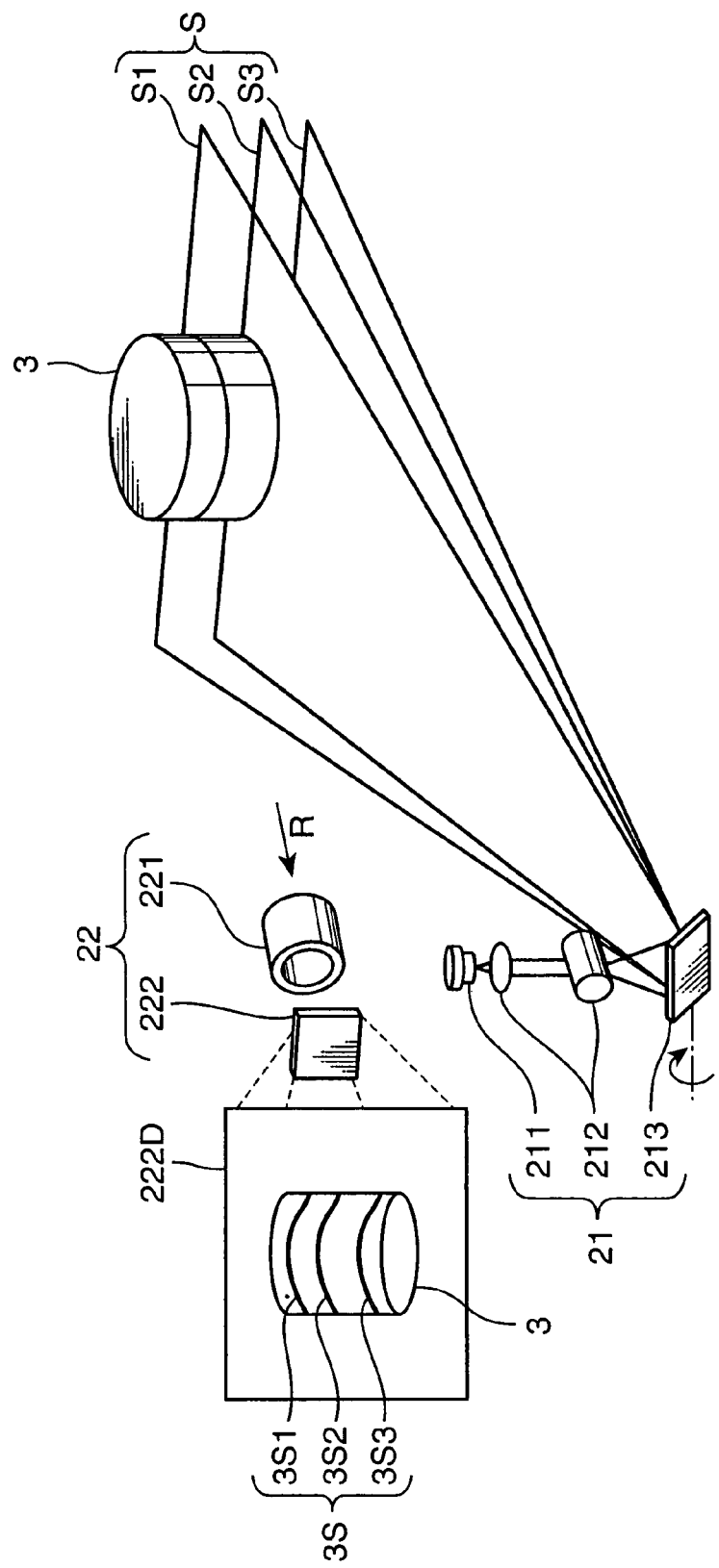
FIG. 3 is a schematic diagram showing a basic internal arrangement of the non-contact three-dimensional shape measuring device.
Figure 4:
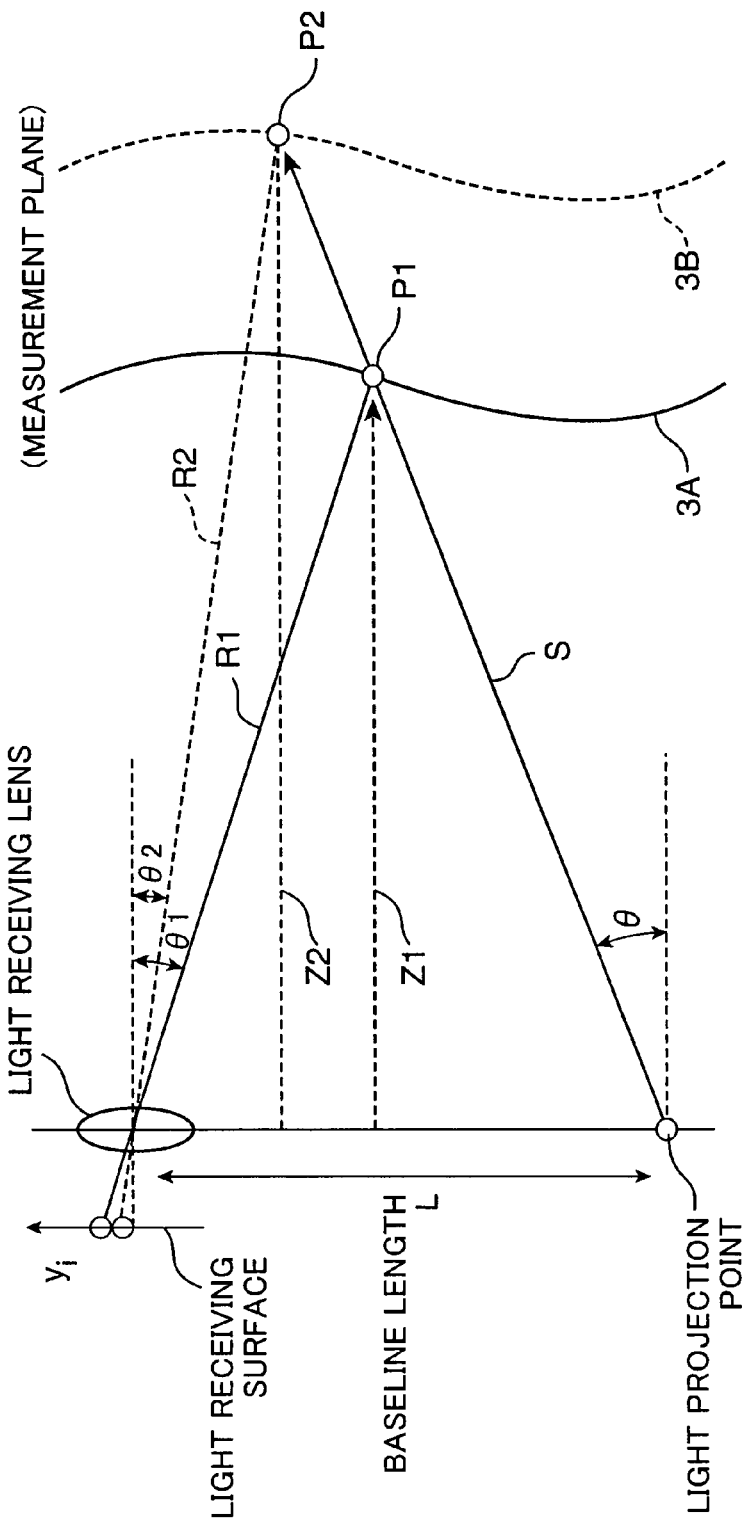
FIG. 4 is a diagram for describing a principle of a three-dimensional shape measuring method to be executed by the non-contact three-dimensional shape measuring device.

FIG. 3 is a schematic diagram showing a basic internal arrangement of the non-contact three-dimensional shape measuring device 2, and FIG. 4 is a diagram for describing a principle of a three-dimensional shape measuring method to be executed by the non-contact three-dimensional shape measuring device 2. As shown in FIG. 3, the light projector 21 includes a laser light source 211 as a light source for generating laser light, a light projection optical system 212 for guiding the slit laser light S to the light projection window, and a galvanometric mirror 213 which is rotated about a plane. The light receiver 22 includes a light receiving optical system 221 for receiving the reflected light R, and an image sensor 222 provided with a CCD (Charge Coupled Device) arranged on an optical path of the light receiving optical system 221. The light receiver 22 has a predetermined measurement depth including a front position and a rear position with respect to a focus position, as measurement dimensions.

The light projector 21 is operated in such a manner that the slit laser light S i.e. slit laser beams S1, S2, and S3 are sequentially projected toward the measurement object 3 by rotating the galvanometric mirror 213 by a predetermined rotation angle. The light projection is carried out to scan the entire area of the measurement object 3. The light R reflected on the measurement object 3 is received by the image sensor 222 via the light receiving optical system 221.

An image 222D detected by the light receiving on the image sensor 222 includes slit images 3S1, 3S2, and 3S3 depending on a stereoscopic configuration of the measurement object 3. Then, a distance from the non-contact three-dimensional shape measuring device 2 to the measurement object 3 is calculated according to the triangulation principle by a data processor provided in the non-contact three-dimensional shape measuring device 2, based on projection angles of the slit laser beams S1, S2 and S3, and the positions of the slit images 3S1, 3S2, and 3S3 formed on a light receiving area of the image sensor 222.

Now, a measurement principle to be implemented in the embodiment is described referring to FIG. 4. First, a projection angle θ of a slit laser beam S projected from a certain light projecting point is obtained based on the rotation angle of the galvanometric mirror 213. Assuming that the slit laser beam S is reflected on a certain point P1 on a certain measurement plane 3A, and a reflected laser beam R1 is incident onto the light receiver 22, a light receiving angle θ1 of the reflected laser beam R1 is calculated based on an imaging position γ1 of the reflected laser beam R1 which is detected on a light receiving surface of the image sensor 222. Then, a distance Z1 to the point P1 on the measurement plane 3A is obtained, according to the triangulation principle, based on the baseline length L between the light projecting point and the light receiving point, the light projection angle θ, and the light receiving angle θ1. The calculation is also applied to a reflected laser beam R2 which is reflected on a certain point P2 on another measurement plane 3B. A distance Z2 to the point P2 on the measurement plane 3B is calculated based on the baseline length L, the light projection angle θ, and the light receiving angle θ2 in a similar manner as mentioned above.

Figure 5:
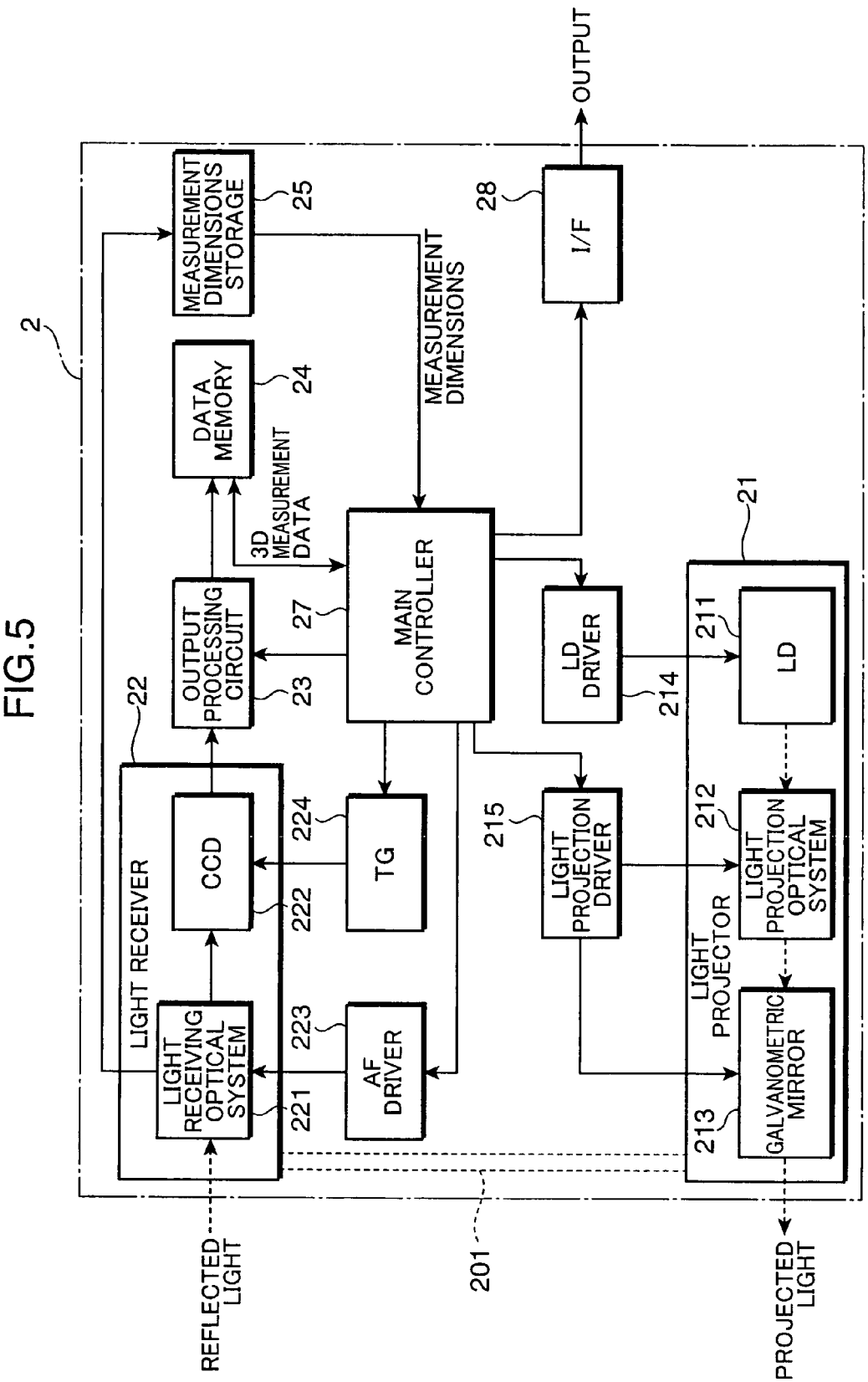
FIG. 5 is a block diagram showing an electric configuration of the non-contact three-dimensional shape measuring device.

FIG. 5 is a block diagram showing an electric configuration of the non-contact three-dimensional shape measuring device 2. The non-contact three-dimensional shape measuring device 2 includes an LD driver 214 and a light projection driver 215 which belong to the light projector 21, an AF driver 223 and a timing generator (TG) 224 which belong to the light receiver 22, an output processing circuit 23, a data memory 24, a measurement dimensions storage 25, a main controller 27, and an I/F (interface) 28.

The light projector 21 includes the laser light source 211, the light projection optical system 212, and the galvanometric mirror 213, and outputs the slit laser light S, which is a laser beam flux irradiated in a fan-like shape, and has the width W in the vertical direction.

The LD driver 214 drives the laser light source 211 constituted of a laser diode or a like device for generating the slit laser light S based on a drive control signal issued from the main controller 27 so that the laser light source 211 is turned on and off by current control.

The light projection driver 215 drives lens elements constituting the light projection optical system 212 for focus/zoom control, and drives the galvanometric mirror 213 to rotate, based on a control signal issued from the main controller 27. Thereby, the light projector 21 is allowed to intermittently project the slit laser light S for scanning the measurement object 3 under the control of the main controller 27.

FIGS. 6A and 6B are schematic diagrams for describing a manner as to how slit laser beams emitted from the light projector 21 are projected to scan the measurement plane 3A. As shown in FIG. 6A, the slit laser light S is sweepingly irradiated from the laser light source 211 onto the measurement object 3 via the galvanometric mirror 213 which is drivingly rotated by the light projection driver 215.

In this embodiment, the laser light source 211 is turned on and off with a predetermined cycle. The portions indicated by the symbols b1, b2, and b3 in FIGS. 6A and 6B correspond to periods when the laser light source 211 is turned on, and correspond to projection areas where the slit laser beams S1, S2, and S3 are respectively projected. On the other hand, the portions indicated by the symbols c0, c1, c2, and c3 in FIG. 6A correspond to periods when the laser light source 211 is turned off. Specifically, the slit laser beams S1, S2, and S3 are sequentially irradiated onto the measurement object 3 in the direction shown by the arrow B in FIG. 6A. Each of the slit laser beams itself emitted from the laser light source 211 is a light beam of a narrow width corresponding to about five pixels in terms of pixels of the image sensor 222. However, when the slit laser beams S1, S2, and S3 are projected for scanning by the periods corresponding to the symbols b1, b2, and b3 by rotation of the galvanometric mirror 213, each of the slit laser beams S1, S2, and S3 is allowed to have a certain width.

FIG. 6B shows an image 222D detected by the image sensor 222 when the slit laser beams S1, S2, and S3 are irradiated. The image sensor 222 is exposed for a period (about several seconds) when the galvanometric mirror 213 is rotated. As a result of the exposure, slit images 3S1, 3S2, and 3S3 corresponding to the projection areas by the slit laser beams S1, S2, and S3 are detected, respectively.

Referring back to FIG. 5, as mentioned above, the light receiver 22 includes the light receiving optical system 221 and the image sensor 222, and is constructed in such a manner that a part of the slit laser light S reflected on the surface of the measurement object 3 is allowed to be incident onto the light receiver 22. The light receiving optical system 221 includes a certain number of taking lens elements, a diaphragm, and a lens moving mechanism for moving the lens elements for a focusing or zooming operation. The AF driver 223 includes a stepping motor, and drives the taking lens elements of the light receiving optical system 221 for a focusing or zooming operation under the control of the main controller 27.

The three-dimensional measurement dimensions provided in the non-contact three-dimensional shape measuring device 2 includes a depth of field having a front position and a rear position, with a focus position being defined as a reference position. Position adjustment of the measurement dimensions is realized when the AF driver 223 drives the light receiving optical system 221.

The image sensor 222 generates two-dimensional image data concerning the measurement object 3 by photoelectrically converting a light image of the measurement object 3 which is formed by the light receiving optical system 221. As an example of the image sensor 222, a CCD color area sensor of a Bayer arrangement may be used, wherein a number of photoelectric conversion elements constituted of e.g. photodiodes are arranged two-dimensionally in a matrix, and color filters having different spectral characteristics of e.g. R (red), G (green), and B (blue) are attached to the light receiving surfaces of the photoelectric conversion elements with a ratio of 1:2:1.

The timing generator 224 generates a timing pulse for controlling an imaging operation by the image sensor 222 e.g. a charge accumulation based on exposure or a readout operation of the accumulated charge. For instance, the timing generator 224 generates a vertical transfer pulse, a horizontal transfer pulse, a charge sweep pulse, and the like, based on an imaging control signal issued from the main controller 27 to drive the image sensor 222.

The output processing circuit 23 applies a predetermined signal processing to an image signal outputted from the image sensor 222 i.e. an analog signal group indicating light receiving on the pixels of the CCD area sensor, and converts the analog image signal into a digital signal for outputting the digital signal. The output processing circuit 23 includes a CDS (correlation double sampling) circuit for reducing a reset noise included in the analog image signal, an AGC (automatic gain control) circuit for correcting the level of the analog image signal, and an analog-to-digital conversion circuit for converting the analog image signal into a digital image signal i.e. image data of e.g. 14 bits.

The data memory 24 includes an RAM (Random Access Memory), and temporarily stores various data therein. For instance, the data memory 24 temporarily stores two-dimensional image data for AF control which has been outputted from the output processing circuit 23 and acquired concerning the measurement object 3, two-dimensional image data for actual measurement, and the like.

The measurement dimensions storage 25 stores information relating to the measurement dimensions, which is provided by the light receiving optical system 221 of the light receiver 22. The measurement dimensions is a fixed value which is determined based on a focal length of the light receiving optical system 221, a lens F value, or the like. The measurement dimensions storage 25 outputs, to the main controller 27, coordinate information concerning the measurement dimensions in xyz axis directions, which corresponds to a status of the light receiving optical system 221. The measurement depth of the measurement dimensions coincides with the z-axis direction.

The main controller 27 has a CPU (Central Processing Unit), and controls operations of the various components of the non-contact three-dimensional shape measuring device 2. Specifically, the main controller 27 controls the light projector 21 to project slit laser light S, controls the AF driver 223 to drive the light receiving optical system 221, controls the timing generator 224 to generate a timing pulse, controls the output processing circuit 23 to apply a predetermined processing to a signal, and controls the data memory 24 to record data therein.

The I/F 28 is an interface for enabling data communication with an external device such as the personal computer 4. Two-dimensional image data or like data concerning the shape of the measurement object 3, which has been temporarily stored in the data memory 24, is transmitted to the external device including the personal computer 4 via the I/F 28.

The light projector 21 and the light receiver 22 are securely fixed to each other by a mechanical fixing member 201 (see FIG. 5) to keep the light projector 21 and the light receiver 22 from being displaced one from the other. The fixation is provided because the distance between the light projector 21 and the light receiver 22 serves as the baseline length L in performing triangulation.

Figure 7:
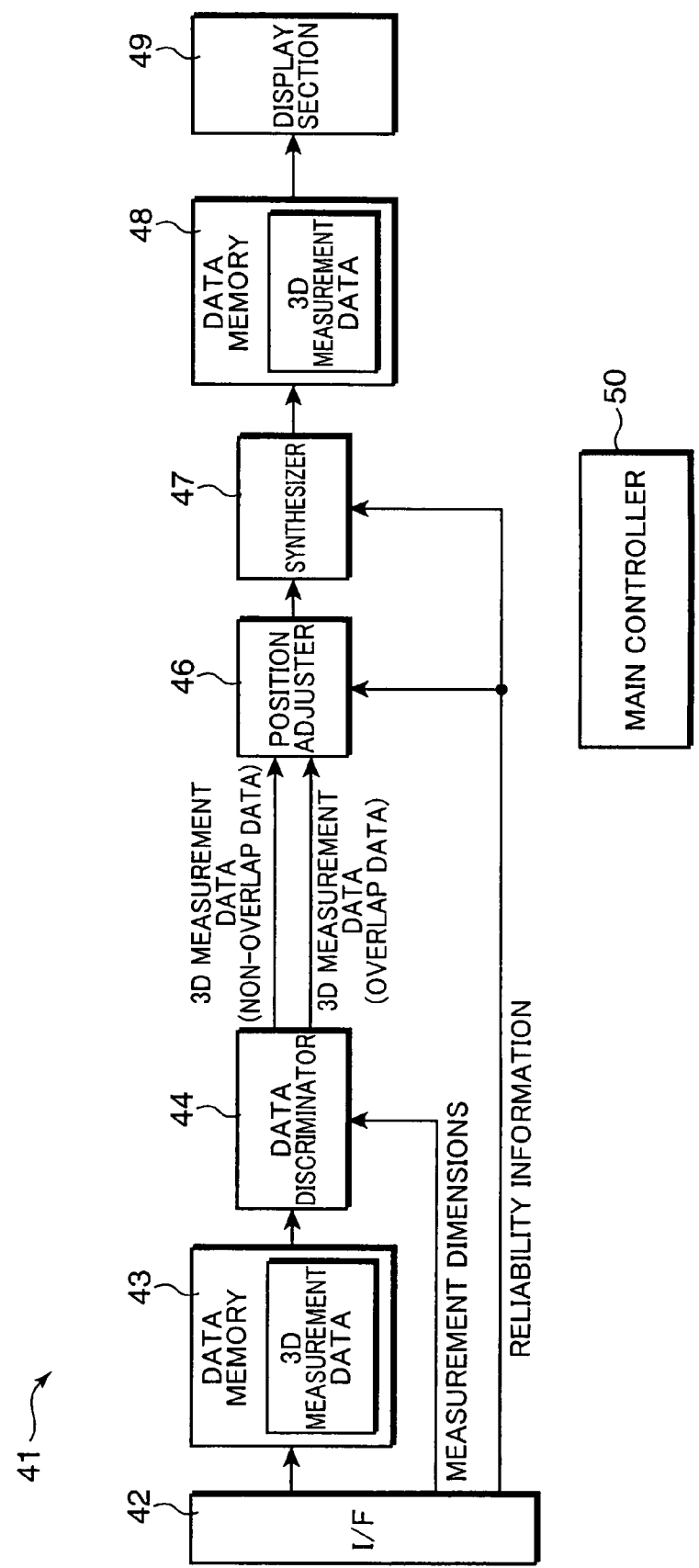
FIG. 7 is a functional block diagram showing a data integrating section of a personal computer of the three-dimensional shape measuring apparatus.

FIG. 7 is a functional block diagram of the data integrating section 41 in the personal computer 4. The functions of the functional blocks shown in FIG. 7 are realized by operating a hardware constituted of a computation processor provided with a microcomputer, and a peripheral circuit such as an RAM or an ROM (Read Only Memory) by a predetermined software. The data integrating section 41 includes an I/F 42, a data memory 43, a data discriminator 44, a position adjuster 46, a synthesizer 47, a data memory 48, a display section 49, and a main controller 50.

Three-dimensional measurement data to be transmitted from the I/F 28 of the non-contact three-dimensional shape measuring device 2, information relating to the measurement dimensions, and information relating to reliability, which will be described later, are received by the I/F 42. Among these data/information, multiple three-dimensional measurement data which have been acquired by shifting the measurement dimensions multiple times are stored in the data memory 43.

The data discriminator 44 judges whether the measurement result data obtained by the multiple measurements i.e. the multiple measurement data stored in the data memory 43 includes an overlap portion i.e. overlap data, using the measurement dimensions information, and discriminates three-dimensional measurement data with overlap data from three-dimensional measurement data without overlap data, and inputs the discrimination result to the position adjuster 46. The three-dimensional measurement data with overlap data are first measurement data and second measurement data. Specifically, the first measurement data is obtained by performing a first measurement operation in a condition that three-dimensional measurement dimensions are set by focusing a certain portion on the measurement object 3. The second measurement data is obtained, following the first measurement data, by performing a second measurement operation in a condition that measurement dimensions are set by shifting the measurement dimensions in such a manner that the measurement dimensions to be used in the second measurement operation is at least partly overlapped with the measurement dimensions to be used in the first measurement operation.

The position adjuster 46 performs position adjustment i.e. position registration with respect to overlap data in the measurement data, which will be described later. Also, the position adjuster 46 performs position adjustment with respect to the non-overlap data in association with the overlap data in the measurement data.

The synthesizer 47 generates single contiguous measurement data by synthesizing multiple measurement data concerning individual parts of the measurement object 3, after the position adjuster 46 performs position registration with respect to measurement points on the measurement object 3. It should be noted that the measurement data may be divided into plural files in the aspect of data storage. The measurement data after the synthesis by the synthesizer 47 is displayed on the display section 49. The aforementioned operations are controlled by the main controller 50.

As described above, as shown in FIG. 8, in measuring the shape of the measurement object 3 having a certain depth by the non-contact three-dimensional shape measuring device 2, in the case where the depth of field including a front position and a rear position with respect to a certain focus position is smaller than the entire dimension of the measurement object 3 in the depthwise dimension i.e. the z-axis direction, the main controller 27 performs measurement multiple times while changing the focus position, with the measurement dimensions in the widthwise direction i.e. the x-axis direction and in the height direction i.e. the y-axis direction being fixed. In other words, the main controller 27 performs measurement multiple times while shifting the three-dimensional measurement dimensions in the depthwise direction.

Figure 8:
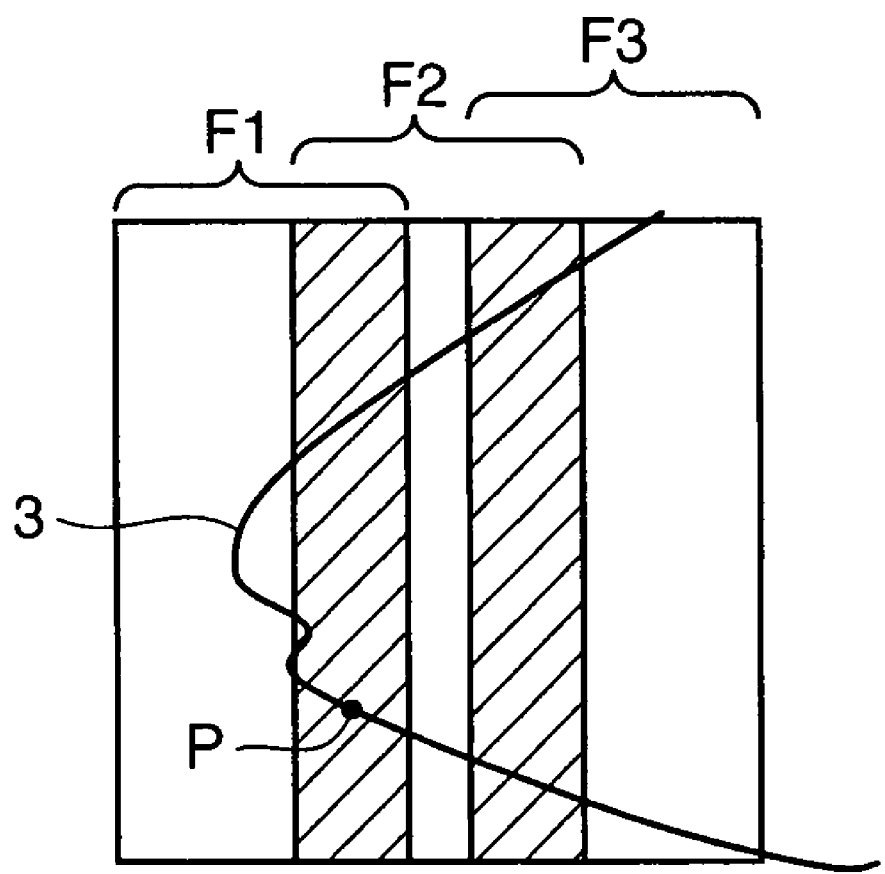
FIG. 8 is a diagram for describing a manner as to how the shape of a measurement object having a depthwise dimension is measured by the non-contact three-dimensional shape measuring device.

FIG. 8 shows an example of conducting the measurement thrice, wherein measurement dimensions at the respective measurements are indicated by the symbols F1, F2, and F3. Hatched portions in FIG. 8 where the measurement dimensions F1, F2, and F3 are overlapped indicate overlap areas where overlap data is obtained, and blank portions in FIG. 8 where the measurement dimensions F1, F2, and F3 are not overlapped indicate non-overlap areas where non-overlap data is obtained. With respect to a certain measurement point P on the measurement object 3, there are three data, i.e. two data representing a relatively focused state, and one data representing an out-of-focus state, because the measurement point P is in the overlap area of the measurement dimensions F1 and F2.

In the data integrating section 41 of the personal computer 4, the data discriminator 44 correlates the information representing the respective measurement dimensions F1, F2, and F3 i.e. at different focus positions to the measurement results obtained by shifting the measurement dimensions in the depthwise direction i.e. the z-axis direction; selects and outputs, to the position adjuster 46, single data representing a focused state if there is found the single data representing the focused state from the data obtained at a certain measurement point, whose x-coordinate value and y-coordinate value are identical; and selects and outputs, to the position adjuster 46, two data representing a focused state if there are found the two data representing the focused state.

The position adjuster 46 performs position adjustment with respect to the measurement results i.e. the measurement data that have been obtained by using the measurement dimensions F1, F2, and F3 i.e. at different focus positions in association with the reliability information to be outputted from the main controller 27 in a manner, which will be described later. The information relating to focus positions can be used firstly as the reliability information outputted from the non-contact three-dimensional shape measuring device 2.

As shown in FIGS. 9A and 9B, the focus position is expressed by a distance M to a focal point position set by the non-contact three-dimensional shape measuring device 2. Generally, as shown in FIGS. 9A and 9B, as the distance M is increased, an angle α of light that has been projected from the light projector 21, reflected on the measurement point, and received on the light receiver 22 is decreased, with the result that resolution performance of the light receiver 22 is lowered, which may likely cause measurement error and degrade measurement precision. Therefore, comparing measurement data obtained e.g. at the focus position corresponding to 600 mm and the focus position corresponding to 700 mm, the measurement data obtained at the closer focus position i.e. 600 mm is conceived to have higher reliability.

The reliability information may also include information relating to focal lengths of a lens element. As shown in FIGS. 10A and 10B, as the focal length of the lens element of the light receiver 22 is increased, the angle β of view is decreased, with the result that resolution performance of the light receiver 22 is enhanced. Accordingly, in the case where the non-contact three-dimensional shape measuring device 2 is mounted with three different exchangeable lenses i.e. a telephoto lens, a middle lens, and a wide angle lens, the telephoto lens is conceived to provide higher reliability than the middle lens or the wide angle lens. The same idea is applied to a zoom lens system.

Figure 11:
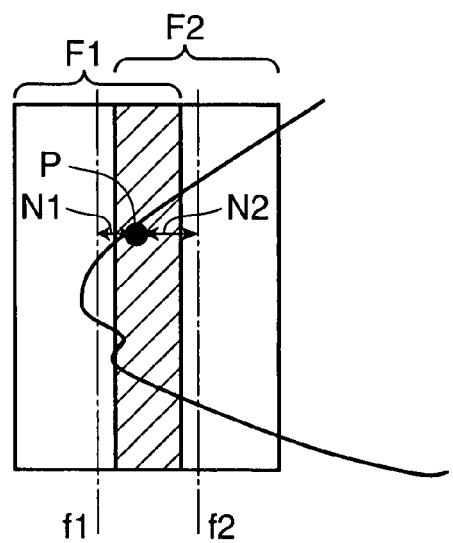
FIG. 11 is a diagram for describing a focal point usable as the reliability information.

The reliability information may also include information relating to focal points with respect to focus positions. The focus position in the middle of the measurement dimensions F1, F2, and F3 as the depth of field, or its vicinity, serves as a focal point portion. Generally, measurement data obtained at a position closer to the focus position has higher data reliability. If an imaging position is away from the focus position, optical resolution performance of the lens element is degraded due to an out-of-focus state of the lens element, which may resultantly lower the data reliability. In view of this, as shown in FIG. 11, in the case where the measurement point P is included in the two measurement dimensions F1 and F2, the position adjuster 46 uses a distance N1 from the measurement point P to the focal point f1 of the measurement dimensions F1, and a distance N2 from the measurement point P to the focal point f2 of the measurement dimensions F2 in the depthwise direction i.e. the z-axis direction, as the information relating to focal points.

In the case where the focal points f1 and f2 are not located in the middle of the measurement dimensions F1 and F2, respectively, in other words, in the case where a degree of out-of-focus is different between the front focal point and the rear focal point, appropriate correction may be performed by e.g. multiplying the distance N1, N2 by a weight corresponding to the out-of-focus degree.

The reliability information may also include information relating to calibration distances. In a non-contact three-dimensional shape measuring device with a variable focus position, calibration of the measuring device is performed at plural discrete focus positions i.e. calibration distances, and calibration data is calculated at the different calibration distances. Calibration means calculating a calculation parameter i.e. calibration data for deriving three-dimensional data i.e. polygon data constituted of xyz-coordinates based on data e.g. count values obtained by measurement. The calibration data is optimized by measuring the known dimensions of a stereoscopic object, and based on the measured dimensions of the stereoscopic object. In actual measurement of the shape of the measurement object, three-dimensional data is derived by applying the aforementioned calibration data to the data e.g. count values obtained by the measurement and performing three-dimensional calculation.

In the above operation, the calibration data itself may be used as the measurement data to be obtained at the focus position coincident with the calibration distance. However, in the case where the focus position does not coincide with the calibration distance, generally, calibration data at the focus position is calculated by using calibration data to be obtained at a position close to the focus position, or interpolating calibration data at plural calibration distances close to the focus position, or implementing a like technique.

Figure 12:
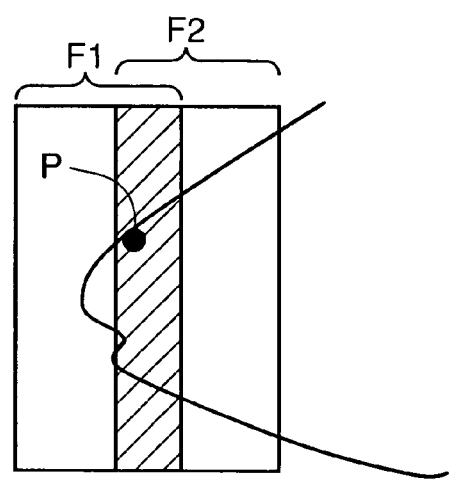
FIG. 12 is a diagram for describing a calibration distance usable as the reliability information.

Calibration data to be obtained in the case where the focus position does not coincide with the calibration distance has degraded precision and lowered data reliability, as compared with calibration data to be obtained in the case where the focus position coincides with the calibration distance. Accordingly, as shown in FIG. 12, in the case where the measurement point P is located both in the measurement dimensions F2 i.e. the focus position which is coincident with the calibration distance, and in the measurement dimensions F1 i.e. the focus position which is not coincident with the calibration distance, measurement data to be obtained by using the measurement dimensions F2 has higher data reliability, because the measurement dimensions F2 are set at the focus position coincident with the calibration distance.

The information relating to focus positions, the information relating to focal lengths of the lens element, the information relating to focal points, and the information relating to calibration distances are parameters to be used in conducting measurement by the non-contact three-dimensional shape measuring device 2. As described above, the position adjuster 46 obtains the information from the non-contact three-dimensional shape measuring device 2. Alternatively, information other than the above, which is usable as the reliability information, may be obtained from the data integrating section 41 based on the output level of measurement data.

Figure 13A:
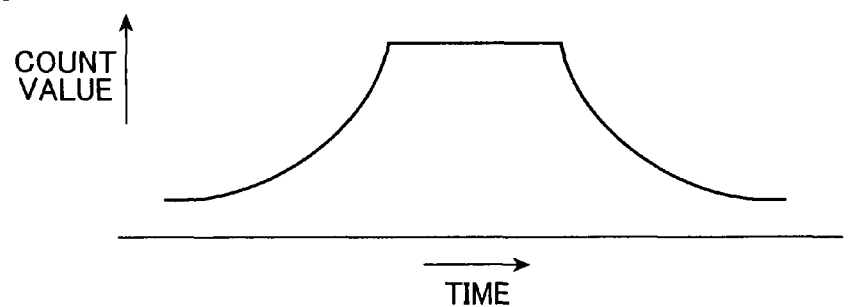
FIGS. 13A through 13C are diagrams for describing a magnitude of measurement data usable as the reliability information.
Figure 13B:
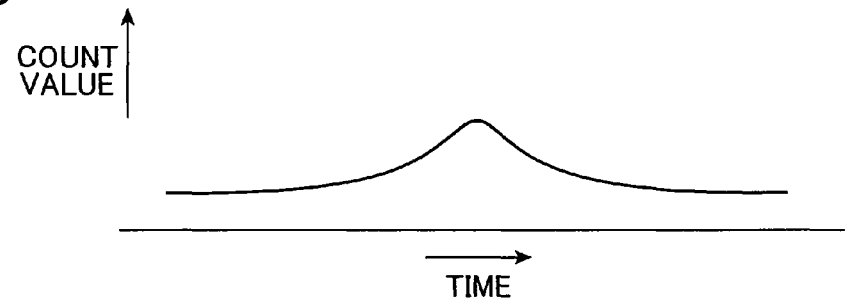
Figure 13C:
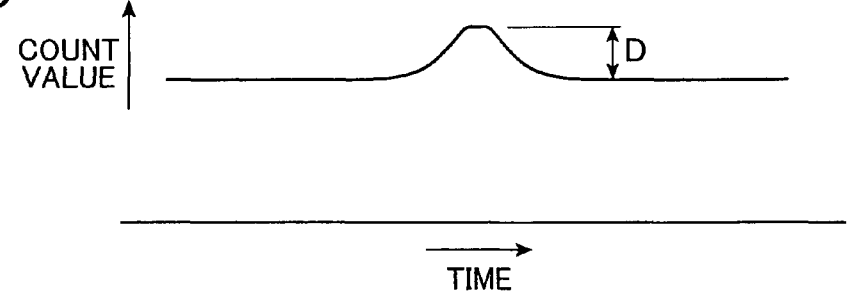

The output level is e.g. a magnitude of measurement data, S/N, or dynamic range. For instance, as shown in FIG. 13A, in the case where a received light amount is unduly large and data output is saturated, reliability of measurement data is low. Also, as shown in FIG. 13B, in the case where a received light amount is unduly small, data output is low, and S/N is poor, reliability of measurement data is also low. Further, as shown in FIG. 13C, in the case where a dark noise level i.e. a noise floor is high due to an influence of external light such as fluorescent light, incandescent light, outdoor light, or a like light component, and a substantial dynamic range D of data is narrow, reliability of measurement data is also low.

The reliability information to be obtained from the data integrating section 41 may also include information such as measurement data error with respect to a function model corresponding to scanning light for measurement, other than the output level of measurement data. The information may be derived from measurement data itself.

Figure 14:
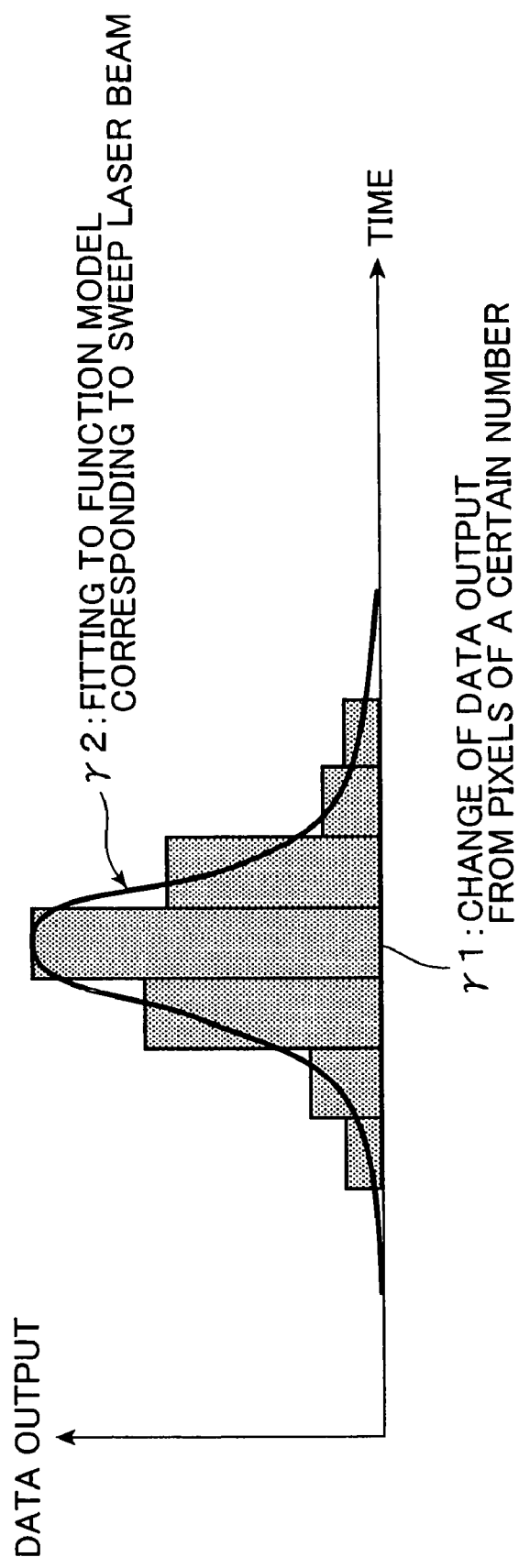
FIG. 14 is a diagram for describing measurement data errors with respect to a function model corresponding to scanning light for measurement, which is usable as the reliability information.

Specifically, in the case where the light cutting method using slit laser light S is adopted in measurement as described above, luminance level data as indicated by the symbol γ1 in FIG. 14 is obtained from each pixel of the image sensor 222 provided with e.g. 640×480 pixels at each sampling timing generated by the timing generator 224. Then, three-dimensional data is calculated by obtaining a centroid of a time axis i.e. a time centroid, and performing calculation, using calibration data. The calculation is performed with respect to all the pixels.

An approach for applying a function model is proposed as an example of a method for obtaining the time centroid. In case of using slit laser light S, there is conceived an idea of applying e.g. a Gaussian distribution as an idealistic function model. Change in luminance level in this case is shown by the curve indicated by the symbol γ2 in FIG. 14.

Figure 15:
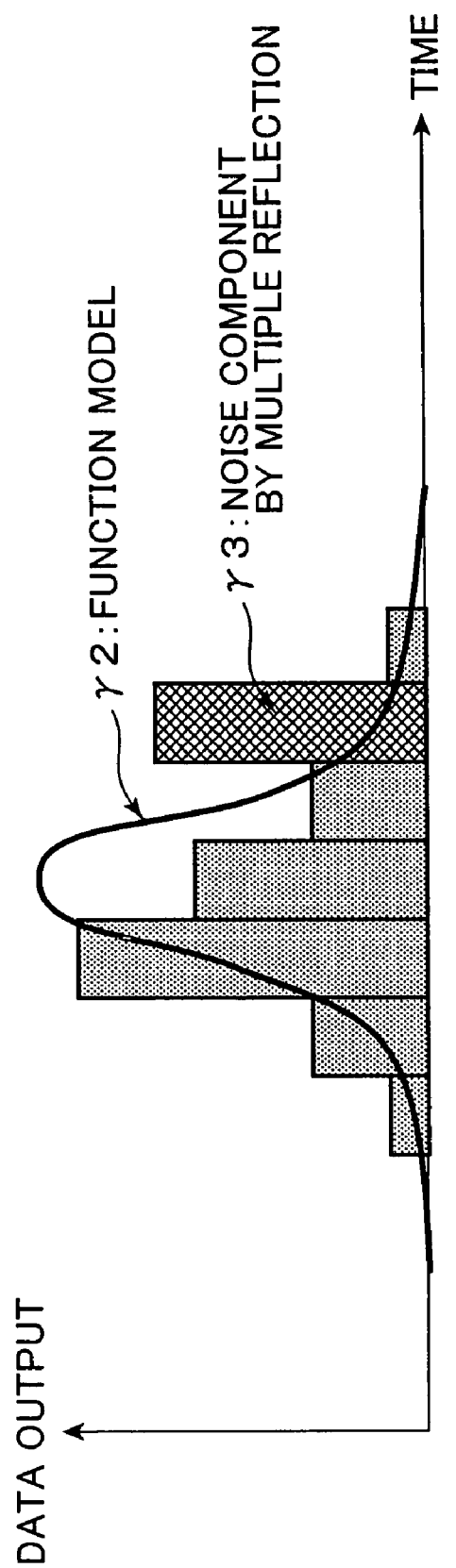
FIG. 15 is a diagram for describing measurement data errors with respect to a function model corresponding to scanning light for measurement, which is usable as the reliability information.

However, in the case where the surface of the measurement object 3 has a metallic luster, noise may likely to be generated due to a specular reflection component or multiple reflection. The magnitude of noise can be expressed as a fitting error in fitting the data output to the function model. For instance, in case of multiple reflection, as shown by the symbol γ3 in FIG. 15, a peak of data output appears at plural sites, which may generate a large fitting error. In view of this, it is judged that data reliability is low if a fitting error with respect to the function model is large, and data reliability is high if a fitting error with respect to the function model is small. Thus, the fitting error can be used in selecting data concerning the overlap portion.

The position adjuster 46 performs position adjustment i.e. data registration, which will be described below, concerning the respective reliability information. The synthesizer 47 performs synthesis i.e. merging, as will be described later. In the case where reliability information is obtained based on the output level of measurement data or the measurement data error with respect to the function model, it is required to provide a calculating section for calculating the reliability information in the data integrating section 41.

Figure 16:
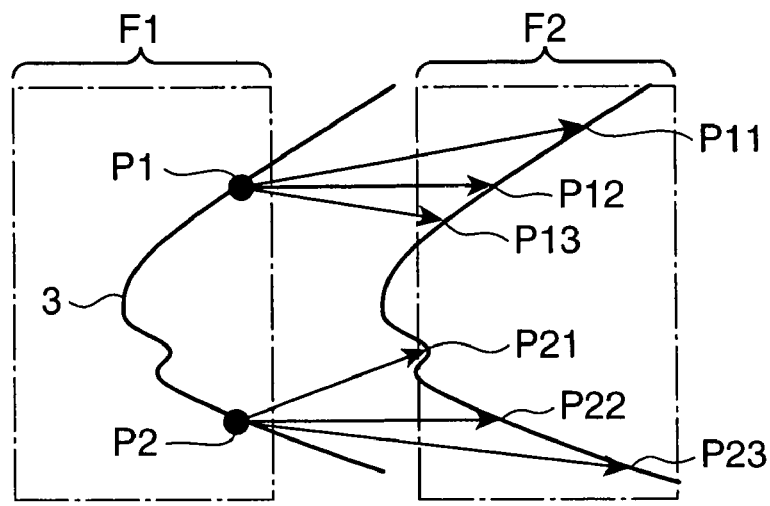
FIGS. 16 through 18 are diagrams for describing a function of a position adjuster in the embodiment.
Figure 17:
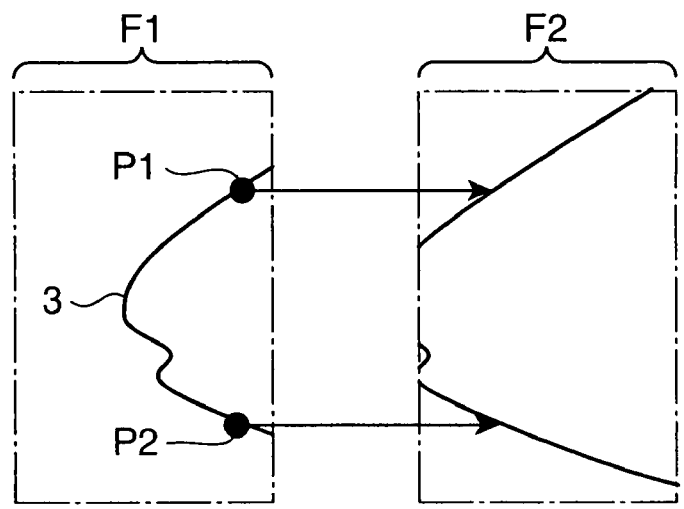
Figure 18:
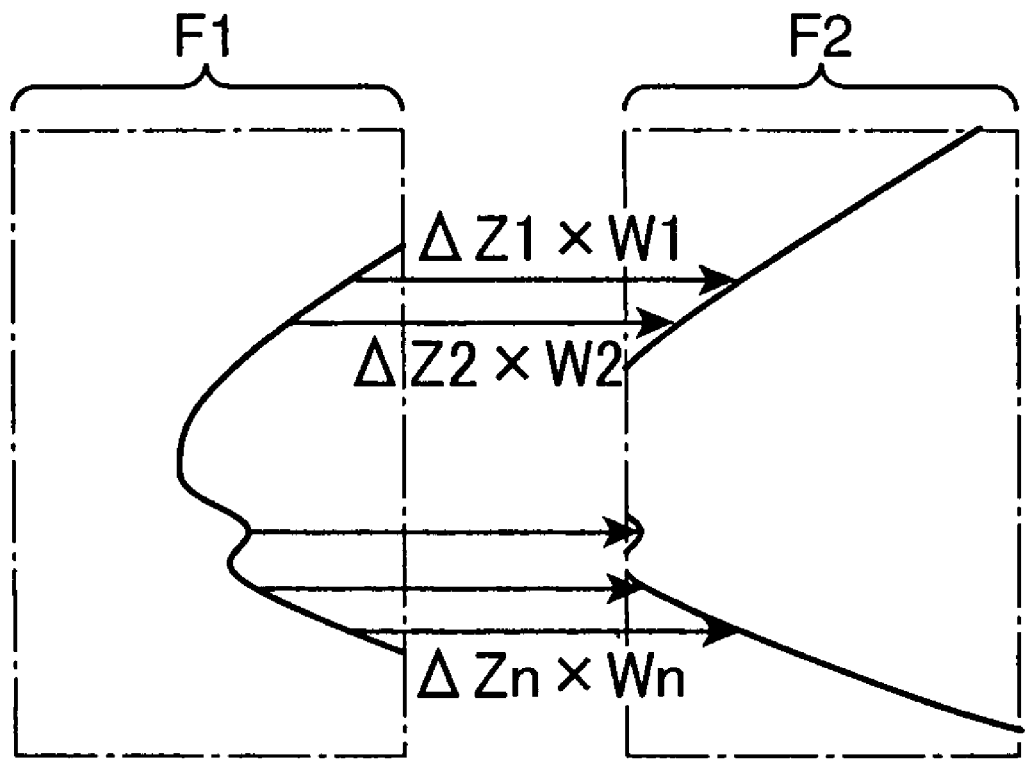

FIGS. 16 through 18 are diagrams for describing a function of the position adjuster 46. As described above, the non-contact three-dimensional shape measuring device 2 measures the measurement object 3 at a certain angular position multiple times while shifting the measurement dimensions in the depthwise direction i.e. the z-axis direction by changing the focus position of the light receiver 22 by the focus controller 29. Since the coordinate systems in the x-, y-axis directions are substantially identical among the obtained multiple measurement data, the position adjuster 46 is allowed to perform position adjustment by shifting the measurement dimensions in the depthwise direction i.e. the z-axis direction.

The position adjustment is generally performed, e.g. as shown in FIG. 16, by matching the coordinate axis of one of two data obtained by using the measurement dimensions F1 and F2 i.e. at different focus positions with the coordinate axis of the other one of the two data by coordinate transformation. Specifically, as shown in FIG. 16, points P11, P12, and P13 in the other one of the two data, which correspond to and are most proximate to the measurement point P1 included in the one of the two data; and points P21, P22, and P23 in the other one of the two data, which correspond to and are most proximate to the measurement point P2 included in the one of the two data are searched, and then, optimization is performed to minimize the sum of the measurement errors between the corresponding points.

If the measurement dimensions are shifted in the depthwise direction i.e. in the z-axis direction, the coordinate systems in the x-, y-axis directions are substantially identical among the measurement data, because merely the focus position is changed. Accordingly, as shown in FIG. 17, search of the most proximate points can be omitted, or a processing time required by a software can be shortened by regarding identical pixels in two data as most proximate points. Also, automatic position adjustment can be performed without the need of the user's designating a corresponding point, or using a spherical member or a marker, which enables to alleviate an operation of the user.

An amount to be shifted by the position adjuster 46 is determined, considering the reliability information concerning the overlap portion, in shifting the measurement dimensions F1 toward the measurement dimensions F2 in the depthwise direction i.e. the z-axis direction for position adjustment, as shown in e.g. FIG. 17.

Specifically, as shown in FIG. 18, a weighted average $\Delta Z_{average}$ is obtained by applying reliability information Wi to a displacement amount $\Delta Z_i$ in the depthwise direction i.e. in the z-axis direction with respect to the corresponding points, and coordinate transformation of shifting the measurement dimensions by the weighed average $\Delta Z_{average}$ in the z-axis direction is performed. The corresponding points are the points whose x-coordinate value and y-coordinate value are identical among the data detected on the same pixel. The displacement amount $\Delta Z_i$ is a difference between a z-coordinate value in the measurement dimensions F1 i.e. a focus position, and a z-coordinate value in the measurement dimensions F2 i.e. another focus position at the pixel i=1 through n. In other words, the weighted average $\Delta Z_{average}$ at the respective corresponding points can be obtained by implementing the following formula.

$$\Delta Z_{average} = \Sigma(\Delta Z_i \times W_i)/\Sigma(W_i)$$

The reliability information Wi is given by the sum of the reliability information Wi at the corresponding points, or a lower reliability value between the corresponding points, or the like.

The data after the position adjustment is synthesized i.e. merged into single contiguous data by the synthesizer 47 by applying the reliability information to the data in the overlap portion. Specifically, as mentioned above, in the case where the shape of the measurement object 3 is measured multiple times while changing the focus position, identical pixels are regarded as corresponding points among the multiple measurement data, and synthesis is performed by performing weighted averaging, since the coordinate systems in the x-, y-axis directions are substantially identical among the multiple measurement data.

For instance, in the case where the information relating to focal points in association with focus positions, which has been described referring to FIG. 11, is used as the reliability information, measurement data concerning the measurement point P which has been obtained at the focal point f1 of the measurement dimensions F1 has higher reliability, because the focal point f1 is closer to the focus position. Accordingly, a weighted average is obtained by satisfying the formulae: wa>wb, and wa+wb=1, where wa and wb are weights to be weighted to data DF1 and DF2 obtained by using the measurement dimensions F1 and F2, respectively. Data DF after the synthesis can be calculated by implementing the following formula.

$$DF=(wa \times DF1)+(wb \times DF2)$$

The data synthesis may be performed in a more simplified manner, without performing the aforementioned weighted averaging. For instance, data having higher reliability may be exclusively adopted i.e. 100% in rate. Further alternatively, since shifting of the measurement dimensions is carried out based on the reliability information by the position adjuster 46, simple average values (e.g. 0.5 and 0.5 if bisection is conducted) concerning the overlap data may be obtained, without using the reliability information.

As mentioned above, in the three-dimensional shape measuring apparatus 1 of the embodiment, the non-contact three-dimensional shape measuring device 2 measures the shape of the measurement object 3 multiple times in such a manner that at least portions of the measurement dimensions are lapped one over the other; and the three-dimensional shape of the measurement object 3 is measured in a non-contact state by integrating the obtained multiple measurement data by the data integrating section 41 of the personal computer 4. In the operation, the data integrating section 41 performs the data integration, using the reliability information among the multiple measurement data. This eliminates the user's manual operation of erasing unnecessary data, enables to integrate the data with high precision without the need of the user's manual operation, and to enhance data quality of the integrated data concerning the overlap area.

The non-contact three-dimensional shape measuring device 2 performs the measurement multiple times while shifting the measurement dimensions in the depthwise direction i.e. in the z-axis direction by changing the focus position. The data integrating section 41 synthesizes the obtained multiple measurement data, using the reliability information. With this arrangement, the three-dimensional shape of the measurement object 3 having a relatively large projection or recess in the depthwise direction can be measured by extracting and synthesizing portions with better data quality, unlike an arrangement of simply integrating data. Thereby, data with better quality can be acquired, as compared with data obtained by a one-time measurement.

In the embodiment, the non-contact three-dimensional shape measuring device 2 performs measurement multiple times at different focus positions, using common measurement dimensions. Alternatively, in the case where the shape of the measurement object 3 is measured at different angular positions in a plane (x, y) direction, in other words, measurement is performed at different angular positions as shown by the symbols A1 and A2 in FIG. 19A, the data integrating section 41 performs the following operations.

The data discriminator 44 discriminates measurement data with overlap data from measurement data with non-overlap data in a similar manner as mentioned in the embodiment. In the embodiment, data discrimination is performed based on the information relating to measurement dimensions in the depthwise direction i.e. in the z-axis direction. In the modification, data discrimination is performed based on information relating to measurement dimensions in the plane (x, y) direction.

The position adjuster 46 applies the reliability information concerning the overlap portions of the respective measurement data in performing the position adjustment concerning the measurement data, as shown in FIG. 19B, which is obtained at the angle A1, and the measurement data, as shown in FIG. 19C, which is obtained at the angle A2. In this example, as indicated by the symbol A3 in FIG. 19C, noise is included in the overlap portion A4 concerning the measurement data obtained at the angle A2. Accordingly, the measurement data concerning the overlap portion A4 has lower reliability than the measurement data concerning the overlap portion obtained at the angle A1.

Therefore, if position adjustment is performed by the position adjuster 46 without implementing any processing, as shown in FIG. 19D, the entirety of the measurement data obtained at the angle A2 may be shifted in the y-axis direction due to the noise component A3 in the y-axis direction. In this case, as shown in FIG. 19E, the measurement data obtained at the angle A1 and the measurement data obtained at the angle A2 are subjected to position adjustment with high precision by discarding the noise component A3 having low reliability.

The synthesizer 47 may synthesize the measurement data obtained at the angles A1 and A2 by applying degrees of reliability as weights to the measurement data, respectively, to obtain a weighted average in the similar manner as mentioned above; may synthesize data by selecting one of the data having higher reliability; or may synthesize data by using a simple average value, without using the reliability information.

Thus, a three-dimensional shape of a measurement object having relatively large dimensions can be measured with high precision. Also, the shape of a part of the entirety of the measurement object can be measured with high precision by enlargedly imaging a part of the measurement object to obtain multiple measurement data, and synthesizing the multiple measurement data.

The foregoing embodiment and/or modifications primarily include the inventions having the following arrangements.

A three-dimensional shape measuring apparatus according to an aspect of the invention includes: a measuring section, provided with three-dimensional measurement dimensions, for measuring a three-dimensional shape of a measurement object in a non-contact state, the measuring section measuring a three-dimensional shape of a part of the measurement object multiple times by shifting the measurement dimensions to obtain multiple measurement data, the measurement dimensions being shifted in such a manner that at least portions of consecutive measurement dimensions by the shifting are lapped one over the other; and a data integrating section for integrating the multiple measurement data to obtain the three-dimensional shape of the measurement object, the data integrating section executing the data integration, using reliability information attributed to the respective measurement data.

In the above arrangement, since a user is not required to erase unnecessary data, data integration with high precision is enabled, without the need of the user's manual operation. Also, data quality concerning an overlap area of the integrated measurement data can be enhanced.

In the above arrangement, preferably, the measuring section includes: a light projector for projecting measurement light onto the measurement object; and a light receiver for receiving a light component of the measurement light reflected on the measurement object, the light receiver having a focus optical system with a variable focus position, wherein the measuring section performs the measurement the multiple times while shifting the measurement dimensions by changing the focus position of the focus optical system, and the data integrating section executes the data integration, using the reliability information to be applied to the respective measurement data based on the focus positions.

In the above arrangement, the measurement is performed multiple times while shifting the measurement dimensions in the depthwise direction i.e. in the z-axis direction by changing the focus position. Then, the data integrating section synthesizes the obtained multiple measurement data, using the reliability information. This enables to extract and synthesize portions of the measurement data with better data quality, unlike an arrangement of simply integrating measurement data concerning the three-dimensional shape of a measurement object having a relatively large projection or recess in the depthwise direction. Thus, data with better quality can be obtained, as compared with data obtained by a one-time measurement.

The reliability information may include information relating to focal lengths of the focus optical system. In this case, preferably, the light receiver has a focus optical system with a variable focal length, the measuring section performs the measurement the multiple times while changing the focal length of the focus optical system, and the data integrating section executes the data integration, using the reliability information to be applied to the respective measurement data based on the focal lengths.

The reliability information may also include information relating to focus positions and focal points. In this case, preferably, the light receiver has a focus optical system with a variable focus position, and the data integrating section executes the data integration, using the reliability information to be applied to the respective measurement data based on a focus displacement amount corresponding to a distance from the focus position of the focus optical system in obtaining the respective measurement data to a measurement point on the measurement object.

The reliability information may also include information relating to calibration distances. In this case, preferably, the data integrating section executes the data integration, using the reliability information to be applied to the respective measurement data based on a degree of matching between the focus position of the focus optical system in obtaining the respective measurement data, and a calibration distance set to obtain calibration data to be used by the measuring section.

The reliability information may also include information relating to output levels of measurement data. In this case, preferably, the data integrating section executes the data integration, using the reliability information to be applied to the respective measurement data based on an output level of the respective measurement data.

Preferably, the light projector projects scanning light onto the measurement object for measurement, and the light receiver receives a light component of the scanning light reflected on the measurement object, wherein the data integrating section executes the data integration, using the reliability information to be applied to the respective measurement data based on a measurement error with respect to a function model corresponding to the scanning light.

In the above arrangement, preferably, the data integrating section executes a position adjustment with respect to the measurement dimensions to be used in obtaining the multiple measurement data by the measuring section, using the reliability information.

Preferably, the data integrating section integrates the measurement data by synthesizing the multiple measurement data obtained by the measuring section, using the reliability information.

In the above arrangement, the three-dimensional shape of a measurement object with relatively large dimensions can be measured with high precision by measuring the shape of individual parts of the relatively large-sized measurement object by position adjustment i.e. position registration and synthesis i.e. merging. Also, the shape of a part of the entirety of the measurement object can be measured with high precision by enlargedly imaging the part of the measurement object to obtain multiple measurement data, and synthesizing the multiple measurement data.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A three-dimensional shape measuring apparatus, comprising:
    a measuring section, adapted to be provided with three-dimensional measurement dimensions, for measuring a three-dimensional shape of a measurement object in a non-contact state, the measuring section adapted to measure a three-dimensional shape of a part of the measurement object multiple times by shifting the measurement dimensions to obtain a plurality of three-dimensional measurement data, the measurement dimensions being shifted in such a manner that at least portions of consecutive measurement dimensions by the shifting are lapped one over the other; and
    a data integrating section for integrating measurement data of parts of the measurement object to obtain the three-dimensional shape of the measurement object, wherein the data integrating section is configured to:
        receive the plurality of measurement data and a plurality of reliability information, each one of the plurality of measurement data associated with a corresponding one of the plurality of reliability information, wherein the reliability information is based on information selected from the group consisting of focus positions, focal lengths, focal displacement amounts, focal points, calibration distances, and measurement error;
        select the one of the plurality of measurement data having the highest reliability information associated with the respective measurement data as a selected measurement data for the part of the measurement object; and
        execute the data integration using the selected measurement data for each part of the measurement object.

2. The three-dimensional shape measuring apparatus according to claim 1, wherein
    the measuring section includes:

a light projector for projecting measurement light onto the measurement object; and a light receiver for receiving a light component of the measurement light reflected on the measurement object, the light receiver having a focus optical system with a variable focus position, wherein the measuring section is adapted to perform measurement multiple times while changing the focus position of the focus optical system, and the reliability information associated with the respective measurement data is based on the focus positions.

3. The three-dimensional shape measuring apparatus according to claim 1, wherein the measuring section includes:

a light projector for projecting measurement light onto the measurement object; and a light receiver for receiving a light component of the measurement light reflected on the measurement object, the light receiver having a focus optical system with a variable focal length, wherein the measuring section is adapted to perform the measurement multiple times while changing the focal length of the focus optical system, and the reliability information associated with the respective measurement data is based on the focal lengths.

4. The three-dimensional shape measuring apparatus according to claim 1, wherein the measuring section includes:

a light projector for projecting measurement light onto the measurement object; and a light receiver for receiving a light component of the measurement light reflected on the measurement object, the light receiver having a focus optical system with a variable focus position, wherein the reliability information associated with the respective measurement data is based on a focus displacement amount corresponding to a distance from the focus position of the focus optical system in obtaining the respective measurement data to a measurement point on the measurement object.

5. The three-dimensional shape measuring apparatus according to claim 1, wherein the measuring section includes:

a light projector for projecting measurement light onto the measurement object; and a light receiver for receiving a light component of the measurement light reflected on the measurement object, the light receiver having a focus optical system with a variable focus position, wherein the reliability information associated with the respective measurement data is based on a degree of matching between the focus position of the focus optical system in obtaining the respective measurement and a calibration distance of the measuring section.

6. The three-dimensional shape measuring apparatus according to claim 1, wherein the measuring section includes:

a light projector for projecting scanning light onto the measurement object for measurement; and a light receiver for receiving a light component of the scanning light reflected on the measurement object, wherein the reliability information associated with the respective measurement data is based on a measurement error with respect to a function model corresponding to the scanning light.

7. The three-dimensional shape measuring apparatus according to claim 1, wherein the data integrating section is adapted to execute a position adjustment with respect to the measurement dimensions to be used in obtaining the plurality of measurement data by the measuring section, using the reliability information.

8. The three-dimensional shape measuring apparatus according to claim 1, wherein the data integrating section is adapted to integrate the measurement data by synthesizing the plurality of measurement data obtained by the measuring section, using the reliability information.

9. A three-dimensional shape measuring apparatus, comprising:

a measuring section, adapted to be provided with three-dimensional measurement dimensions, for measuring a three-dimensional shape of a measurement object in a non-contact state, the measuring section adapted to measure a three-dimensional shape of a part of the measurement object multiple times by shifting the measurement dimensions to obtain a plurality of three-dimensional measurement data, the measurement dimensions being shifted in such a manner that at least portions of consecutive measurement dimensions by the shifting are lapped one over the other; and a data integrating section for integrating measurement data of parts of the measurement object to obtain the three-dimensional shape of the measurement object, wherein the data integrating section is configured to:

receive the plurality of measurement data and a plurality of reliability information, each one of the plurality of measurement data associated with a corresponding one of the plurality of reliability information, wherein the reliability information is based on information selected from the group consisting of focus positions, focal lengths, focal displacement amounts, focal points, calibration distances, and measurement error;

select the one of the plurality of measurement data having the highest reliability information associated with it as a selected measurement data for the part of the measurement object;

weight the selected measurement data using the associated reliability information for the selected data; and execute the data integration by averaging the weighted selected measurement data with the plurality of measurement data.

10. A three-dimensional shape measuring apparatus, comprising:

a measurement device configured to measure a three-dimensional shape of a part of an object to be measured based on a plurality of measurement parameters, wherein the measurement device is adapted to obtain a plurality of three-dimensional measurement data for each part of the object by measuring the part of the object multiple times and changing at least one measurement parameter each time, is adapted to associate each one of the plurality of measurement data with a corresponding one of reliability information, and is adapted to output the plurality of measurement data and the associated reliability information; and a computer that includes a data integrating section configured to:

receive the plurality of measurement data for each part of the measurement object and the associated reliability information, the associated reliability information being attributed to the measurement parameters and based on information selected from the group consisting of focus positions, focal lengths, focal displacement amounts, focal points, calibration distances, and measurement error, and calculate the three-dimensional shape of the object by integrating selected measurement data for each part of the object, wherein the selected measurement data for each part of the object is a selected one of the plurality of measurement data for each part of the object having the highest associated reliability information.

11. A three-dimensional shape measuring apparatus, comprising:

a measurement device configured to measure a three-dimensional shape of a part of an object to be measured based on a plurality of measurement parameters, wherein the measurement device is adapted to obtain a plurality of three-dimensional measurement data for each part of the object by measuring the part of the object multiple times and changing at least one measurement parameter each time, is adapted to associate each one of the plurality of measurement data with a corresponding one of reliability information, and is adapted to output the plurality of measurement data and the associated reliability information; and a computer that includes a data integrating section configured to:

receive the plurality of measurement data for each part of the measurement object and the associated reliability information, the associated reliability information being attributed to the measurement parameters and based on information selected from the group consisting of focus positions, focal lengths, focal displacement amounts, focal points, calibration distances, and measurement error, select at least one of the plurality of measurement data having the highest reliability information associated with it, weight the at least one of the plurality of measurement data using the associated reliability information, and calculate the three-dimensional shape of the object by integrating the at least one of the plurality of measurement data that has been weighted.

12. A method for measuring a three-dimensional shape of an object, comprising:

obtaining a plurality of three-dimensional measurement data for each part of the object by measuring the part of the object multiple times and changing at least one measurement parameter each time;

associating each one of the plurality of measurement data with a corresponding one of reliability information, the associated reliability information being attributed to measurement parameters and based on information selected from the group consisting of focus positions, focal lengths, focal displacement amounts, focal points, calibration distances, and measurement error; and calculating the three-dimensional shape of the object by integrating a selected measurement data for each part of the object, wherein the selected measurement data for each part of the object is a selected one of the plurality of measurement data for each part of the object having the highest associated reliability information.

13. A method for measuring a three-dimensional shape of an object, comprising:

obtaining a plurality of three-dimensional measurement data for each part of the object by measuring the part of the object multiple times and changing at least one measurement parameter each time;

associating each one of the plurality of measurement data with a corresponding one of reliability information, the associated reliability information being attributed to measurement parameters and based on information selected from the group consisting of focus positions, focal lengths, focal displacement amounts, focal points, calibration distances, and measurement error;

selecting at least one of the plurality of measurement data having the highest reliability information associated with it;

weighting the at least one of the plurality of measurement data using the associated reliability information, and calculating the three-dimensional shape of the object by integrating the at least one of the plurality of measurement data that has been weighted.

* * * * *